United States Patent [19]
Clements

[11] 3,943,374
[45] Mar. 9, 1976

[54] ELECTRICAL POWER GENERATING PLANT

[75] Inventor: Herbert Arthur Clements, Weybridge, England

[73] Assignee: S.S.S. Patents Limited, London, England

[22] Filed: Aug. 5, 1974

[21] Appl. No.: 494,882

[30] Foreign Application Priority Data
Aug. 10, 1973  United Kingdom............... 38092/73

[52] U.S. Cl.................................. 290/52; 415/500
[51] Int. Cl.².......................................... F01D 15/10
[58] Field of Search............ 415/500; 290/30, 4, 52, 290/1

[56] References Cited
UNITED STATES PATENTS

| | | | |
|---|---|---|---|
| 3,188,479 | 6/1965 | Wood et al. ........................... | 290/52 |
| 3,372,645 | 3/1968 | Willi ..................................... | 290/52 |
| 3,405,278 | 10/1968 | Ley....................................... | 290/52 |
| 3,643,426 | 2/1972 | Janelid................................. | 290/52 |
| 3,733,095 | 5/1973 | Sinclair et al......................... | 290/52 |

*Primary Examiner*—Herman J. Hohauser
*Attorney, Agent, or Firm*—Woodcock, Washburn, Kurtz & Mackiewicz

[57] ABSTRACT

Electrical power generating plant of the pumped storage or air storage type comprising a unidirectional turbine, a unidirectional motor/generator and a unidirectional pump or compressor, with a synchronous toothed clutch between the motor/generator and the pump or compressor.

According to the invention the clutch is in an arrangement such that its coacting clutch teeth interengage automatically when the motor/generator tends to rotate in its normal direction relative to the pump or compressor, or when the pump or compressor tends to rotate in the direction opposite to its normal direction of rotation relative to the motor/generator, and the clutch is capable of being set when required to a bi-directionally free condition such that when the plant is operating in the generating mode the motor/generator can be driven by the turbine without the pump or compressor being driven by the turbine.

4 Claims, 11 Drawing Figures

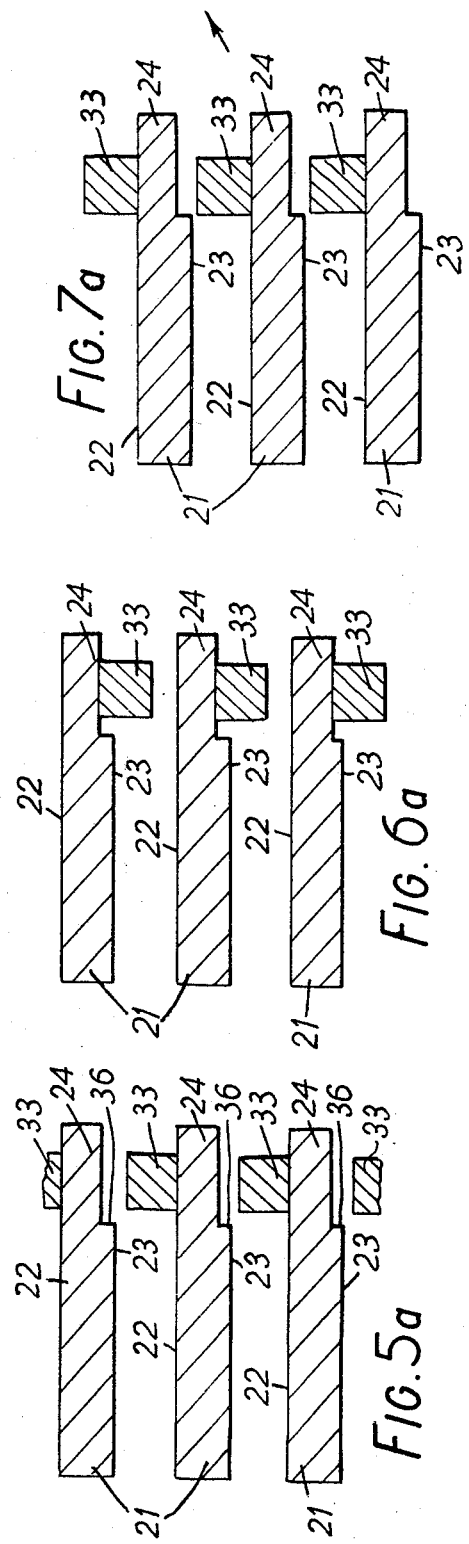
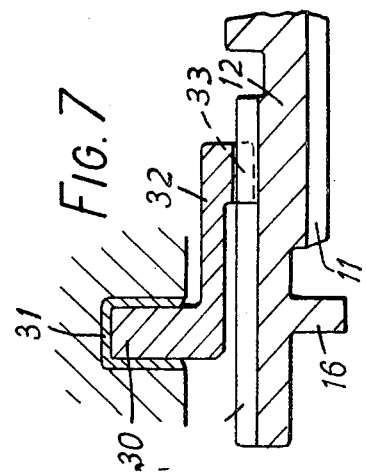
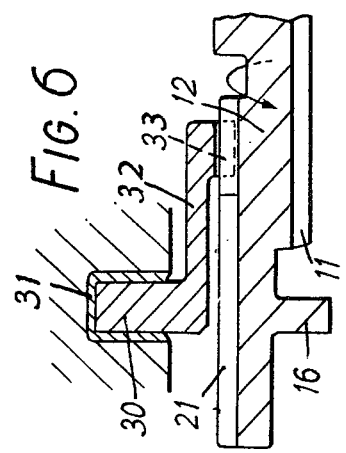
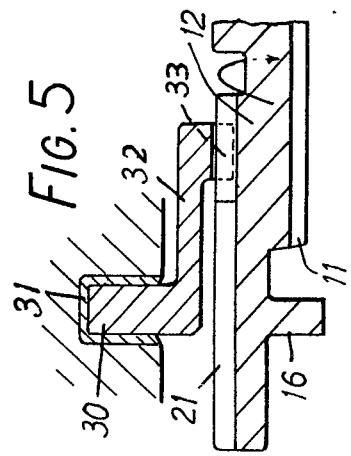

ELECTRICAL POWER GENERATING PLANT

This invention relates to electrical power generating plant of the type that comprises a unidirectional turbine, a unidirectional motor/generator and a unidirectional pump or compressor. Pumped storage plant of this type comprises a hydraulic turbine and a pump, and the plant has two principal modes of operation, namely a generating mode during which the motor/generator acting as a generator is driven by the hydraulic turbine, the pump being inoperative; and a pumping mode during which the pump is driven by the motor/generator acting as a motor, the hydraulic turbine being inoperative. During operation of the plant in the pumping mode the pump raises water to an elevated reservoir, and during operation of the plant in the generating mode water from the reservoir is used to drive the hydraulic turbine. Air storage plant of the said type comprises a gas turbine and a compressor, and the plant has two principal modes of operation, namely a generating mode during which the motor/generator acting as a generator is driven by a gas turbine, the compressor being inoperative, and a compressing mode during which the compressor is driven by the motor/generator acting as a motor, the gas turbine being inoperative. During operation of the air storage plant in the compressing mode the compressor delivers compressed air to a reservoir, and during operation in the generating mode air from the reservoir is mixed with fuel, is burnt and expanded through the gas turbine, which drives the motor/generator.

U.S. Pat. No. 3,733,095 discloses power generating plant of the type referred to above, wherein a synchronous toothed clutch is provided between the motor/generator and the pump or compressor. The clutch is in what may be termed as "inverted" arrangement, that is to say its clutch teeth interengage automatically when the motor/generator tends to rotate in the direction opposite to its normal direction of rotation relative to the pump or compressor, or when the pump or compressor tends to rotate in its normal direction of rotation relative to the motor/generator. The clutch is provided with locking means which when the clutch teeth are interengaged can be operated to prevent disengagement of the clutch teeth, such that during operation of the plant in the pumping or compressing mode the motor/generator can drive the pump or compressor through the clutch, the teeth of which would automatically disengage if the locking means were not engaged, owing to the inverted arrangement of the clutch. In order to interengage the clutch teeth when operation in the pumping or compressing mode is required, turning means are provided for producing appropriate relative rotation between the motor/generator and the pump or compressor. The turning means may operate to rotate the motor/generator in the direction opposite to its normal direction of rotation, relative to the pump or compressor, or to rotate the pump or compessor in its normal direction of rotation, relative to the motor/generator.

When, in the last-described plant, the motor/generator is driving the pump or compressor, owing to the inverted arrangement of the clutch the driving torque from the motor/generator is transmitted to the pump or compressor through the clutch teeth, and through the locking means, hence a high load is exerted on the locking means. From this aspect it would be desirable to use a clutch in which during operation of the plant in the pumping or compressing mode the driving torque is transmitted from the motor/generator to the pump or compressor through the clutch teeth and transmission of torque is not effected through locking means. Such an arrangement has in fact been proposed in connection with pumped storage plant wherein the clutch is a non-synchronous clutch, but the machinery is complicated by the need to provide means for synchronising the clutch in preparation for engagement, the said means including a synchronous clutch between the turbine and the pump, with turning mechanism operable to rotate the pump so as to engage the synchronous clutch, whereupon the turbine is employed to drive the pump up to synchronous speed with the motor/generator, the non-synchronous clutch then being engaged by means of a servo mechanism.

It is customary to provide, between the turbine and the motor/generator, a synchronous toothed clutch in a "non-inverted" arrangement, that is to say in an arrangement such that this clutch tends to engage when the turbine tends to overrun the motor/generator when rotating in its normal direction of rotation, the clutch disengaging when the motor/generator rotates in its normal direction of rotation relative to the turbine so that the motor/generator can, during the pumping or compressing mode, drive the pump or compressor without driving the turbine. It would be advantageous to be able to use a similar clutch, viz. a non-inverted clutch, between the motor/generator and the pump or compressor, but the use of a non-inverted clutch between the motor/generator and the pump or compressor has hitherto been thought to be impracticable for the reason that during operation of the plant in the generating mode, when the turbine is driving the motor/generator, the non-inverted clutch would engage so that the turbine would drive also the pump or compressor.

It has now been realised that a clutch in a non-inverted arrangement can be employed provided that the clutch is capable of being set selectively to a bi-directionally free condition when operation of the plant in the generating mode is required, whereby to enable the motor/generator to be driven by the turbine without the pump or compressor being simultaneously driven.

In accordance with the present invention there is provided electrical power generating plant comprising a unidirectional turbine, a unidirectional motor/generator and a unidirectional pump or compressor, with a synchronous toothed clutch between the motor/generator and the pump or compressor, wherein the clutch is in a non-inverted arrangement such that the clutch teeth interengage automatically when the motor/generator tends to rotate in its normal direction of rotation relative to the pump or compressor, or when the pump or compressor tends to rotate in the direction opposite to its normal direction of rotation relative to the motor/generator, the clutch being capable of being set when required to a bidirectionally free condition such that when the plant is operating in the generating mode the motor/generator can be driven by the turbine without the pump or compressor being driven by the turbine.

A clutch for use in a non-inverted arrangement can be manufactured with greater accuracy than a clutch with selectively operable locking means, for use in an inverted arrangement where under torque transmitting conditions the concentricity of the clutch teeth is more likely to be adversely affected by the combined effects of inaccuracies in the mating components including the locking means. The provision of means for setting the non-inverted clutch to a bidirectionally free condition involves a relatively simple addition to the clutch, which may be of a standard over-running type. Where a clutch in a non-inverted arrangement is provided between the turbine and the motor/generator, a similar addition may be made to this clutch. The two clutches may therefore be of identical construction instead of being of different constructions as in the prior arrangements referred to above.

Desirably, the clutch provided between the motor/generator and the pump or compressor is of the type comprising pawl and ratchet mechanism operative upon passage of the clutch input and output parts through rotational synchronism in one direction of relative rotation to shift an intermediate member helically relative to one of the said clutch parts to effect at least initial interengagement of the coacting clutch teeth. In this case the means for setting the clutch to a bidirectionally free condition may be, for example, operable to bring the clutch to a condition in which the pawls are axially withdrawn relative to the ratchet teeth, or to a condition in which the noses of the pawls are radially withdrawn from the ratchet teeth, such that the pawls are incapable of ratcheting relative to the ratchet teeth or of engaging with them according to the direction of relative rotation of the input and output parts of the clutch. Either of these conditions of the clutch may be termed a pawl-free condition.

In the accompanying drawings,

FIGS. 5, 6 and 7 are detail sectional views, on a larger scale than FIG. 2, showing baulking teeth and a baulking ring in the relative positions that they assume for various conditions of the clutch;

FIGS. 5a, 6a and 7a are development views of baulking teeth and blocking teeth, these Figures corresponding respectively to FIGS. 5, 6 and 7.

Figure 1:
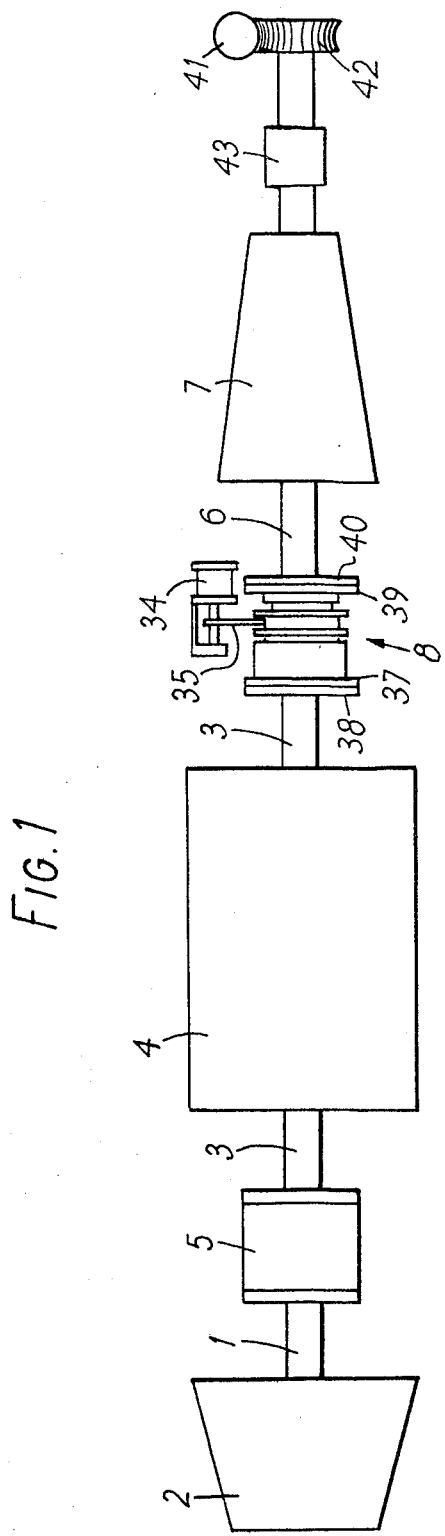
FIG. 1 is a diagrammatic view of an example of electrical power generating plant according to the invention.

Referring to FIG. 1, which illustrates the application of the invention to air storage plant, the shaft 1 of a gas turbine 2 is drivably connected to one end of the shaft 3 of a motor/generator 4, through a synchronous self-shifting toothed clutch 5. The other end of the shaft 3 of the motor/generator 4 is drivably connected to the shaft 6 of a compressor 7 through a synchronous self-shifting toothed clutch 8 which is capable of being set selectively to a unidirectionally free condition or to a bidirectionally free condition, as will be described hereinafter with reference to FIGS 2 to 8. In the unidirectionally free condition the clutch 8 engages automatically when the motor/generator 4 rotating in its normal direction of rotation tends to overrun the compressor 7, and disengages automatically to a unidirectionally free condition when the compressor 7 rotating in its normal direction of rotation tends to overrun the motor/generator 4.

Figure 4:
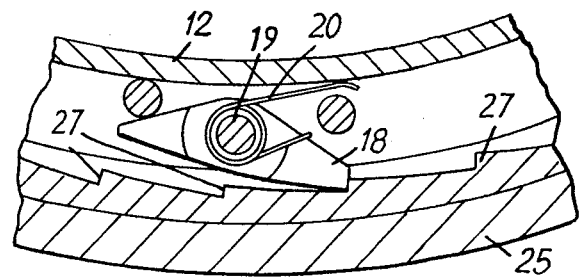
FIG. 4 is a sectional view on the line IV—IV of FIG. 2.

Referring now to FIGS. 2 to 8, the clutch 8 is of the construction disclosed in British Patent Specification No. 1,291,773. The clutch includes a first rotary part 9 formed with external left-hand helical splines 10 with which the engaged internal helical splines 11 in an intermediate member 12, which is thereby constrained for helical movement relative to the clutch part 9, the said helical movement being limited in one direction by an axial stop formed by an annular shoulder 13 on the clutch part 9 and in the other direction by an axial stop formed by an annular flange 14 on a ring 15 fixed to the rotary clutch 9, the flange 14 cooperating with a radially inwardly projecting annular flange 16 in the intermediate member 12. The intermediate member 12 is formed with a ring of external clutch teeth 17, and carries pawls 18 the noses of which point in anti-clockwise direction as viewed from the right-hand end of the clutch (FIG. 4). The pawls 18 are mounted on pawl pins 19 and are provided with control springs 20 which urge the noses of the pawls radially outwardly. The intermediate member 12 is also formed with a ring of external baulking teeth 21, each of which (FIGS. 5a, 6a and 7a) has a straight flank 22 and a flank 23 which is stepped to form a part 24 of reduced circumferential thickness at one end of the tooth. As seen from the left-hand end of the clutch in FIG. 2, the straight flanks 22 of the baulking teeth 21 face in the anticlockwise direction and the stepped flanks 23 face in the clockwise direction.

A second rotary clutch part is constituted by a sleeve 25 carrying a ring of internal clutch teeth 26 and a ring of internal ratchet teeth 27. The sleeve 25 also carries annular members 28 and 29 shaped so as to provide between them an internal groove, in which is accommodated a ring 30 forming part of a blocking tooth carrier. A white metal bearing 31 is provided between the ring 30 and its groove. The blocking tooth carrier also includes a cylindrical member 32 which projects from the inner periphery of the ring 30 and carries a ring of internal blocking teeth 33 which are interengaged with the baulking teeth 21.

Figure 2:
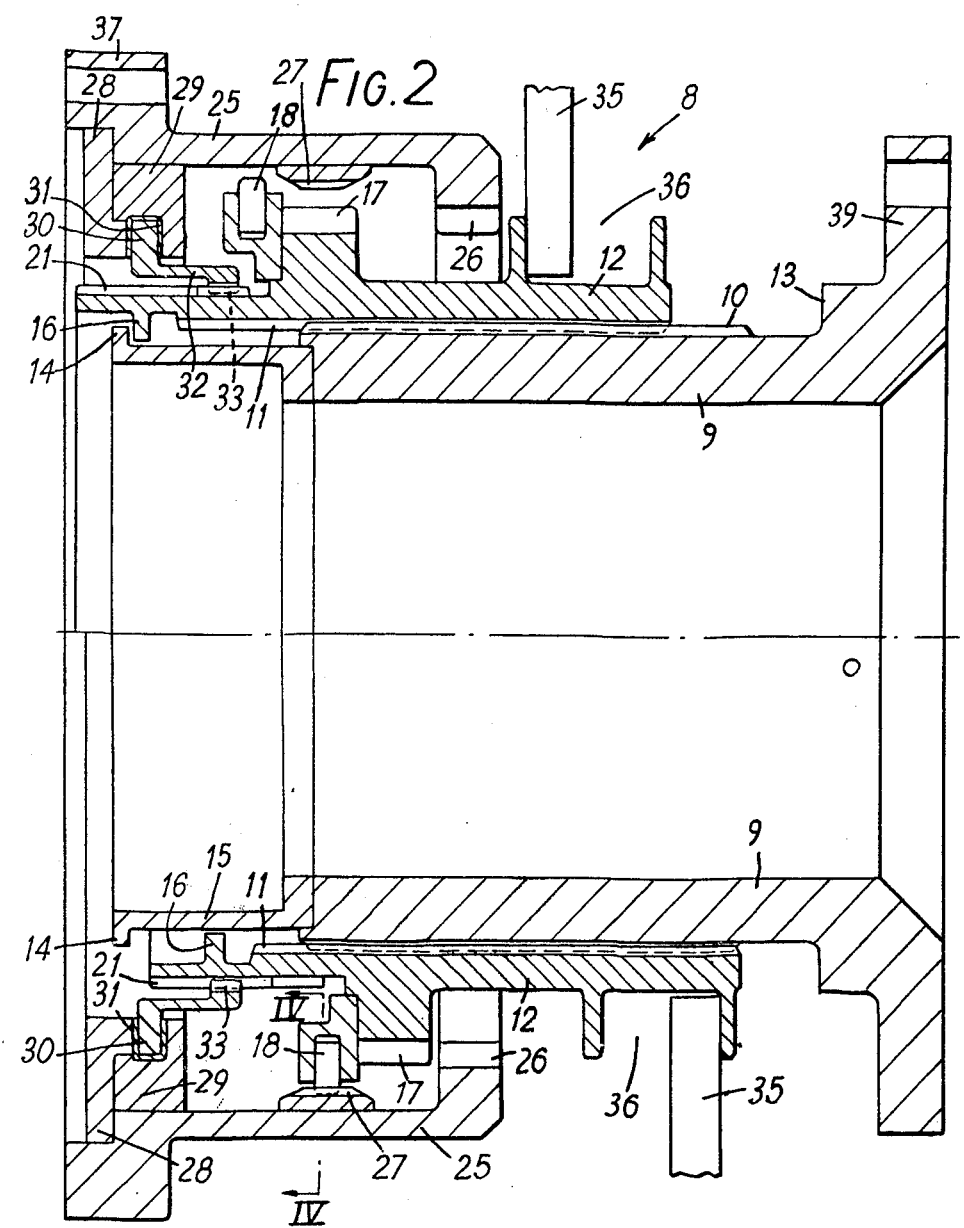
FIG. 2 is a view in side sectional elevation of an example of a synchronous self-shifting toothed clutch employed in the plant shown in FIG. 1. The upper half of FIG. 2 shows the clutch in a bidirectionally free condition and the lower half of FIG. 2 shows the clutch in a unidirectionally free condition.

With the clutch in the unidirectionally free condition, as shown in the lower half of FIG. 2, the external clutch teeth 17 are out of engagement with the internal clutch teeth 26, and the pawls 18 are in ratcheting relationship with the ratchet teeth 27. With the rotary clutch part 25 rotating in anticlockwise direction relative to the rotary clutch part 9 as seen from the right-hand end of the clutch (see FIG. 4), the pawls 18 ratchet relative to the ratchet teeth 27 and the clutch 8 overruns.

The ring 30 forming part of the blocking tooth carrier is rotatably slidable in its lubricated bearing 31. When the clutch parts 9 and 25 are in relative rotation in the overrunning direction as above described, the drag on the ring 30 of the blocking tooth carrier, due to the friction between the ring 30 and the bearing 31, is such that the blocking teeth 33 are maintained in contact with the straight flanks 22 of the baulking teeth 21.

Figure 3:
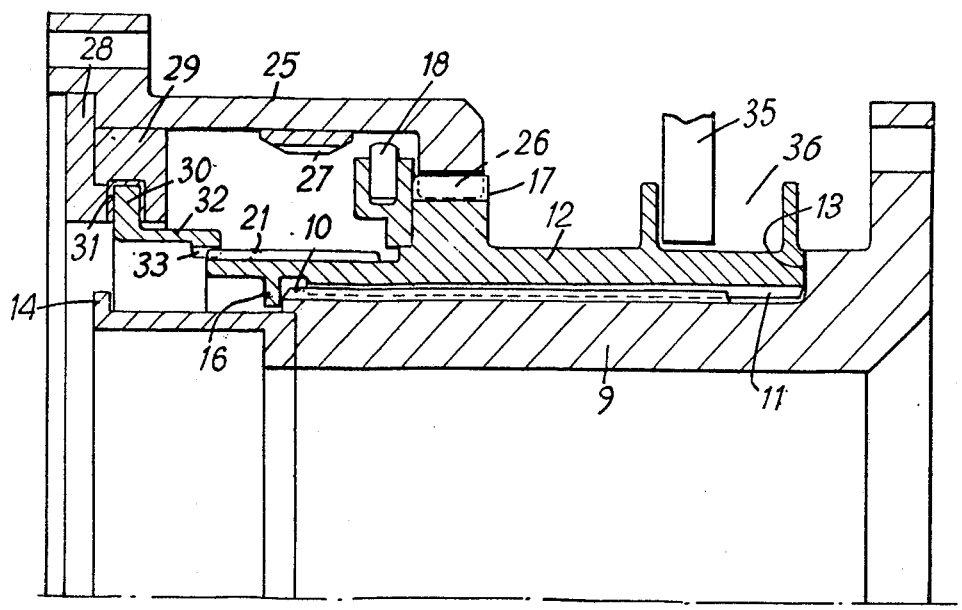
FIG. 3 is a view of the upper half of the clutch in side sectional elevation, showing the clutch in the engaged condition.

When the direction of relative rotation of the clutch parts 9 and 25 reverses, pawls 18 engage ratchet teeth 27, and the intermediate member 12 is thereby shifted helically, to the right in FIG. 2, along the clutch part 9 so as to bring the external clutch teeth 17 into the partial interengagement with the internal clutch teeth 26, whereupon the interaction of the clutch teeth 17 and 26 in conjunction with the interaction of the helical splines 10 and 11 draws the intermediate member 12 into full toothed engagement with the clutch part 25 and against the axial stop 13, so that the clutch is engaged (FIG. 3). When the direction of relative rotation of the clutch parts 9 and 25 again reverses, the interaction of the clutch teeth 17 and 26 in conjunction with the interaction of the helical splines 10 and 11 shifts the intermediate member 12 to the left so as to bring the external clutch teeth 17 out of engagement with the internal clutch teeth 26 and to bring the pawls 18 back into ratcheting engagement with the ratchet teeth 27, as shown in the lower half of FIG. 2. During these movements of the intermediate member 12 the straight flanks 22 of the baulking teeth 21 slide relative to the blocking teeth 33.

As so far described, the clutch is unidirectionally free, that is to say for one direction of relative rotation of the clutch parts 9 and 25 the clutch overruns with the pawls 18 ratcheting relative to the ratchet teeth 27, whereas upon reversal of the direction of relative rotation of the clutch parts 9 and 25 the clutch engages as above described.

In order to bring the clutch to a condition of bi-directional freedom, viz., the pawl free condition, the intermediate member 12 is shifted to the left from the position shown in the lower half of FIG. 2 to a position in which the pawls 18 are axially clear of the ratchet teeth 27, as shown in the upper half of FIG. 2. This movement of the intermediate member 12 may for example be effected by operating by means of a servo motor 34 (FIG. 1) an axially movable control fork 35 engaged with lost motion in an external annular groove 36 in the intermediate member 12. During this movement of the intermediate member 12 the baulking teeth 21 move so far to the left that the blocking teeth 33 move on to the parts 24 of the baulking teeth 21 of reduced circumferential width. So long as the direction of relative rotation of the clutch part 9 and the intermediate member 12 relative to the clutch part 25 corresponds to the ratcheting direction of relative rotation of the pawls 18 and ratchet teeth 27, as shown by the arrow in FIG. 5, the blocking teeth 33 are held in contact with the straight flanks 22 of the baulking teeth 21 (FIG. 5 a) by the frictional drag on the blocking tooth carrier due to the friction between the ring 30 and the surfaces of the bearing 31 in which it is accommodated. Under these conditions it is possible, by operating the control fork 35, to shift the intermediate member 12 to the right to bring the pawls 18 into ratcheting relationship with the ratchet teeth 27 (lower half of FIG. 2). If, however, while the clutch is in the pawl free condition the direction of relative rotation of the clutch parts 9 and 25 is in the opposite direction (indicated by the arrow in FIG. 6) the blocking teeth 33 are held, by frictional drag, against the flanks of the narrow parts 24 of the baulking teeth 21, on the stepped sides 23 thereof as shown in FIG. 6a. Hence if under these conditions an attempt is made to shift the intermediate member 12 to the right the steps 36 on the baulking teeth 21 come into axial engagement with the blocking teeth 33 so as to prevent further movement of the intermediate member 12 to the right such as would bring the pawls 18 into contact with the ratchet teeth 27 and cause damage.

The operator is therefore obliged to wait for the direction of relative rotation of the clutch parts 9 and 25 to reverse before the intermediate member 12 can be shifted to the right. When such reversal takes place, the frictional drag on the blocking tooth carrier bring the blocking teeth 33 on to the straight flanks of the baulking teeth 21 (FIG. 5a), so that there is no longer any obstruction to movement of the intermediate member 12 to the right to bring the pawls 18 into ratcheting relationship with the ratchet teeth 27.

Figure 8:
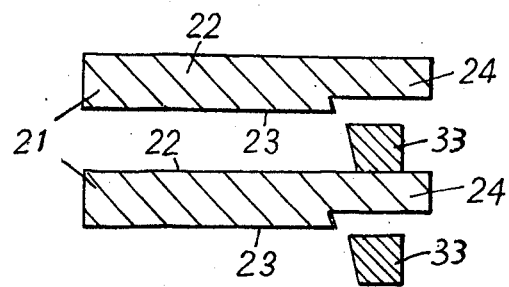
FIG. 8 is a detail view illustrating a modification of the baulking teeth and blocking teeth.

As illustrated in FIG. 8, the baulking teeth 21 and the blocking teeth 33 may be undercut so as to provide an interlocking action between the baulking teeth and the blocking teeth.

When the clutch 8 is incorporated in the plant shown in FIG. 1, a flange 37 on the clutch part 25 is bolted to a flange 38 on the shaft 3 of the motor/generator 4, and a flange 39 on the clutch part 9 is bolted to a flange 40 on the shaft 6 of the compressor 7.

During operation of the plant in the generating mode, the clutch 8 is in the bi-directionally free condition (upper half of FIG. 2) such that the gas turbine 2 can drive the motor/generator 4 without the compressor 7 being driven. When it is required to change over to the compressing mode the motor/generator 4 is disconnected from the mains and the gas turbine 2 is shut down while the motor/generator 4 still continues in rotation due to its inertia, with the clutch 5 overrunning. The compressor 7 is then rotated at a low speed in its normal direction of rotation by means of an auxiliary motor of low power (not shown) driving through reduction gearing 41, 42 and a synchronous self-shifting clutch 43. When the speed of the motor/generator 4 has decreased to a speed lower than the speed of the compressor 7 that is maintained in rotation by the auxiliary motor, the pawls 18 and ratchet teeth 27 are rotating at relative speeds such that it is feasible to set the clutch 8 to the unidirectionally free ratcheting condition (lower half of FIG. 2). The auxiliary motor is then shut down, and the gas turbine 2 is operated to accelerate the motor/generator 4 through the clutch 5, such that at rotational synchronism between the motor/generator 4 and the compressor 7 the clutch 8 will automatically engage, so that the compressor 7 can be driven up to full speed by the power of the gas turbine 2 transmitted through the shaft of the motor/generator 4, which is then connected to the mains to operate as a motor. Thereupon the turbine 2 is shut down, and the clutch 5 between the gas turbine 2 and the motor/generator 4 disengages automatically when the turbine is retarded and brought to rest.

When it is required to change over from the compressing mode to the generating mode, the motor/generator 4 is disconnected from the mains and decelerates while the compressor 7 is maintained in rotation at low speed by the aforesaid auxiliary motor. As soon as the speed of the motor/generator 4 falls below the speed of the compressor 7 the clutch 8 will be set to the bidirectionally free condition (upper half of FIG. 2) whereupon the gas turbine 2 can be used to drive the motor/generator 4 through the clutch 5 up to high speed without the compressor 7 being driven.

Clearly the invention may be applied to pumped storage plant wherein a hydraulic turbine is provided in place of the gas turbine 2, and wherein a pump is provided in place of compressor 7.

I claim:

1. Electrical power generating plant of the type comprising a unidirectional turbine, a unidirectional motor/generator and a unidirectional pump, wherein a synchronous clutch having coacting sets of clutch teeth is provided between the motor/generator and the pump, with the improvement that the clutch is in a non-inverted arrangement such that the coacting sets of clutch teeth interengage automatically upon rotation of the shaft of the motor/generator in its normal direction of rotation relative to the shaft of the pump, and that the clutch is capable of being set selectively to a bi-directionally free condition such that during operation of the plant in the generating mode motor/generator can be driven by the turbine without the pump being driven by the turbine.

2. Electrical power generating plant of the type comprising a unidirectional turbine, a unidirectional motor/generator and a unidirectional compressor, and wherein a synchronous clutch having coacting sets of clutch teeth is provided between the motor/generator and the compressor, with the improvement that the clutch is in a non-inverted arrangement such that the coacting sets of clutch teeth interengage automatically upon rotation of the shaft of the motor/generator in its normal direction of rotation relative to the shaft of the compressor, and that the clutch is capable of being set selectively to a bi-directionally free condition such that during operation of the plant in the generating mode the motor/generator can be driven by the turbine without the compressor being driven by the turbine.

3. Electrical power generating plant of the type comprising a unidirectional gas turbine, a unidirectional motor/generator and a unidirectional compressor, wherein a synchronous clutch having sets of coacting clutch teeth is provided between the motor/generator and the compressor, with the improvement that the clutch is in a non-inverted arrangement such that the coacting sets of clutch teeth interengage automatically upon rotation of the shaft of the motor/generator in its normal direction of rotation relative to the shaft of the compressor, and that the clutch is capable of being set selectively to a bi-directionally free condition such that when the plant is operating in the generating mode the motor/generator can be driven by the gas turbine without the compressor being driven by the gas turbine.

4. Electrical power generating plant of the type comprising a unidirectional hydraulic turbine, a unidirectional motor/generator and a unidirectional pump, and wherein a synchronous clutch having coacting sets of clutch teeth is provided between the motor/generator and the pump, with the improvement that the clutch is in a non-inverted arrangement such that the coacting sets of clutch teeth interengage automatically upon rotation of the shaft of the motor/generator in its normal direction relative to the shaft of the pump, and that the clutch is capable of being set selectively to a bi-directionally free condition such that when the plant is operating in the generating mode the motor/generator can be driven by the hydraulic turbine without the pump being driven by the hydraulic turbine.

* * * * *